United States Patent [19]

Sidman et al.

[11] Patent Number: 5,459,383
[45] Date of Patent: Oct. 17, 1995

[54] ROBUST ACTIVE DAMPING CONTROL SYSTEM

[75] Inventors: Michael D. Sidman, Colorado Springs, Colo.; Harry S. Hvostov, Acton, Mass.

[73] Assignee: Quantum Corporation, Milpitas, Calif.

[21] Appl. No.: 259,361

[22] Filed: Jun. 14, 1994

Related U.S. Application Data

[63] Continuation of Ser. No. 652,554, Feb. 7, 1991, abandoned.

[51] Int. Cl.$^6$ ................................................. G05B 5/01
[52] U.S. Cl. ........................... 318/611; 318/560; 318/628; 318/561; 318/618
[58] Field of Search ................................. 318/560–646; 360/70–88

[56] References Cited

U.S. PATENT DOCUMENTS

| | | | |
|---|---|---|---|
| 3,660,744 | 5/1972 | Plummer | 318/616 |
| 4,051,423 | 9/1977 | Touchton et al. | 318/611 |
| 4,089,494 | 5/1978 | Anderson et al. | 318/628 |
| 4,200,827 | 4/1980 | Oswald | 318/561 |
| 4,221,995 | 9/1980 | Barkman | 318/616 |
| 4,246,795 | 1/1981 | Sigg et al. | 73/651 |
| 4,267,496 | 5/1981 | Ivanou et al. | 318/615 |
| 4,321,517 | 3/1982 | Touchton et al. | 318/618 |
| 4,659,175 | 4/1972 | Sordello | 318/624 |
| 4,660,106 | 4/1987 | Harrison et al. | 360/77 |
| 4,724,370 | 2/1988 | Moraru et al. | 318/561 |
| 4,806,835 | 2/1989 | Habermann | 318/607 |
| 4,885,516 | 12/1989 | El-Sadi | 318/615 |
| 4,947,093 | 8/1990 | Dunstan et al. | 318/560 |
| 4,963,806 | 10/1990 | Shinohara et al. | 318/621 |
| 4,967,293 | 10/1990 | Aruga et al. | 360/78.12 |
| 5,032,776 | 7/1991 | Garagnon | 318/611 |
| 5,062,012 | 10/1991 | Maeda et al. | 360/75 |
| 5,119,254 | 6/1992 | Brown et al. | 360/106 |
| 5,136,561 | 8/1992 | Goker | 369/32 |
| 5,180,958 | 1/1993 | Choshitani et al. | 318/623 |

OTHER PUBLICATIONS

Sidman, "Adaptive Control of a Flexible Structure," A Dissertation Submitted to the Department of Electrical Engineering and the Committee on Graduate Studies of Stanford University, Jun. 1986.

*Primary Examiner*—Paul Ip
*Attorney, Agent, or Firm*—David B. Harrison

[57] ABSTRACT

Methods and apparatus for providing improved gain and bandwidth and robust damping of mechanical resonances for a servo control system by providing a collocated or nearly collocated feedback loop that operates in parallel with the ordinary feedback loop used for position or velocity feedback.

10 Claims, 5 Drawing Sheets

ROBUST ACTIVE DAMPING CONTROL SYSTEM

This application is a continuation of application Ser. No. 07/652,554 filed Feb. 7, 1991, now abandoned.

FIELD OF THE INVENTION

The present invention relates to electromechanical servo control systems, and more particularly to methods and apparatus for improving the response characteristics of the servo control systems with an auxiliary feedback loop to provide robust active damping of mechanical resonances.

BACKGROUND OF THE INVENTION

Electromechanical servo control systems as applied to electromechanical positioning and velocity control systems are often adversely affected by mechanical actuator resonances. These resonances generally cannot be damped effectively by conventional servo control systems. Typical servo systems that have mechanical actuator resonances include those used for transducer head positioning in disc drives. These mechanical actuator resonances limit control loop gain of the servo system, reduce bandwidth of the servo system, or both. This causes the controlled element, such as a transducer head, to have excessive settling time after positioning, poor response to disturbances, poor tracking ability, or any combination of these.

Control loop stability problems may also result from these lightly damped structural resonances that are associated with the mechanical actuator. Prior art systems have made use of gain stabilizing filters such as electronic notch filters inserted in the control loop path. These filters are inserted in the forward path of the control loop to filter out the signal information within the band reject frequency range of the notch and therefore help minimize excitation of these actuator resonances by the servo control system itself.

The technique utilizing notch filters described above allows the servo control system to effectively ignore lightly damped structural actuator resonances in that very little control effort may be applied by the servo controller at frequencies where notch filters attenuate the control signal. However, the use of notch filters does nothing to reduce the sensitivity of the servo system to other types of disturbances that excite the mechanical resonances, such as those caused by servo amplifier saturation and distortion, external forces on the carriage such as caused by seek activity, air turbulence, stiction, and so forth. This is because such disturbances are typically generated at points in the control which does not lend themselves to correction when such gain stabilizing filters exist in the control loop. Although the notch filters, coupled in a forward path configuration, will serve to reduce steady state frequency components of the control signal in the bandwidth of the notched structural resonances, they do not necessarily inhibit the excitation of these resonances by these disturbances external to the servo loop.

The exciting effect of power amplifier non-linearity, when due to saturation or cross-over distortion, is generally not eliminated with the notch filtering process, and such forms of disturbance, appearing directly at the input to the mechanical process to be controlled, continues to provide undesirable excitation of the lightly damped structural resonances. Likewise, seek induced excitation and other mechanical disturbances that are due to external excitation other than that of the actuator itself are not reduced by the notch filtering process.

Gain stabilization in the form of low-pass filtering is also used for control loop gain stabilization. In this case, the cutoff frequency of a low-pass filter that is inserted in the control loop is generally lower than the frequencies of any of the lightly damped resonances of the actuator structure that are desired to be attenuated in their effect on the control loop. In this way, the signal components of the control signal are substantially prevented from exciting the lightly damped resonances of the actuator structure. This helps ensure system stability, but it also increases phase shift at frequencies in the vicinity of the servo loop's unity gain crossing, thereby reducing the bandwidth of the servo system. This is true of all gain stabilizing filters, including notch filters. This reduction in bandwidth in turn reduces the ability of the servo system to correct low frequency vibration and tracking performance such as run out and other disturbances that are due to external excitation and non-linearities in positioning operations.

Typical servo control systems sense motion at so called "non-collocated" locations on the actuator or its payload, such as at arm tips on disc drives. "Non-collocated" in this context means that there is substantial flexibility between the means of sensing vibration and the "point of control" for the structure. The "point of control" is the location on the actuator structure where control effort is applied.

The prior art approaches to non-collocated control, as applied to servo systems for transducer head positioning, cannot robustly dampen structural resonances, such as the lightly damped motor actuator resonances, because adequate loop gain cannot be consistently maintained at or near resonant frequencies, especially if there is variability in the magnitude or damping of actuator resonances. This is because the non-uniform phase characteristic of the actuator practically limits the loop bandwidth attainable with closed loop stability, a mandatory requirement. For such systems, the loop phase uncertainty becomes too high to close a stable high gain feedback loop at or near resonant frequencies as required for robust active damping. "Robust" means the control system is relatively insensitive to changes in actuator dynamics, in this case, resonances.

SUMMARY OF THE INVENTION

The present invention overcomes the ordinary limitations of electromechanical positioning and velocity control systems such as used for transducer head positioning in disc drives by utilizing a collocated or nearly collocated feedback loop that is embedded within the servo position feedback system loop. The collocated or nearly collocated feedback loop has a motion sensor, such as an accelerometer, that is located in the servo system at or near the point of control.

Vibration of the structure caused by excitation both internal and external to the control loop is robustly actively damped by the system. Mechanical resonances excited by control action of the actuator motor are damped by first measuring the vibrations at or near the actuator motor itself before these vibrations are propagated through the rest of the mechanical structure of the actuator, and feeding back these measured vibrations with a high gain feedback loop into the servo system so as to robustly actively dampen them.

The collocated or nearly collocated feedback loop has the effect of making the servo system perform as if the mechanical structure of the system has much higher mechanical damping than it actually possesses. Sufficient feedback is provided to damp out the substantial resonances that adversely affect the servo system within the frequency range necessary to provide the desired rate of response. In this way, the servo system achieves high overall servo loop gain over the entire frequency range of interest without sacrificing system stability. System stability is provided by the active damping control loop instead of notch or low pass filtering the servo loop signal itself. The active damping loop compensator is designed to impose much less phase loss than a servo loop that is stabilized with low-pass and/or notch filters.

By increasing the system stability with the active damping control loop, the servo system also achieves greater tolerance to system component variations because the need to maintain the accurate frequency and phase relationships in the feedback loop for the notch filters are eliminated. Thus, the robustness, or tolerance of the system to external and internal variation, is greatly enhanced.

Lastly, the actively damped servo system, unlike a gain stabilized servo system, can act to reduce the effect of excitation stemming from external forces and disturbances on servo system positioning excitation.

DETAILED DESCRIPTION OF THE PREFERRED EMBODIMENT

Figure 1:
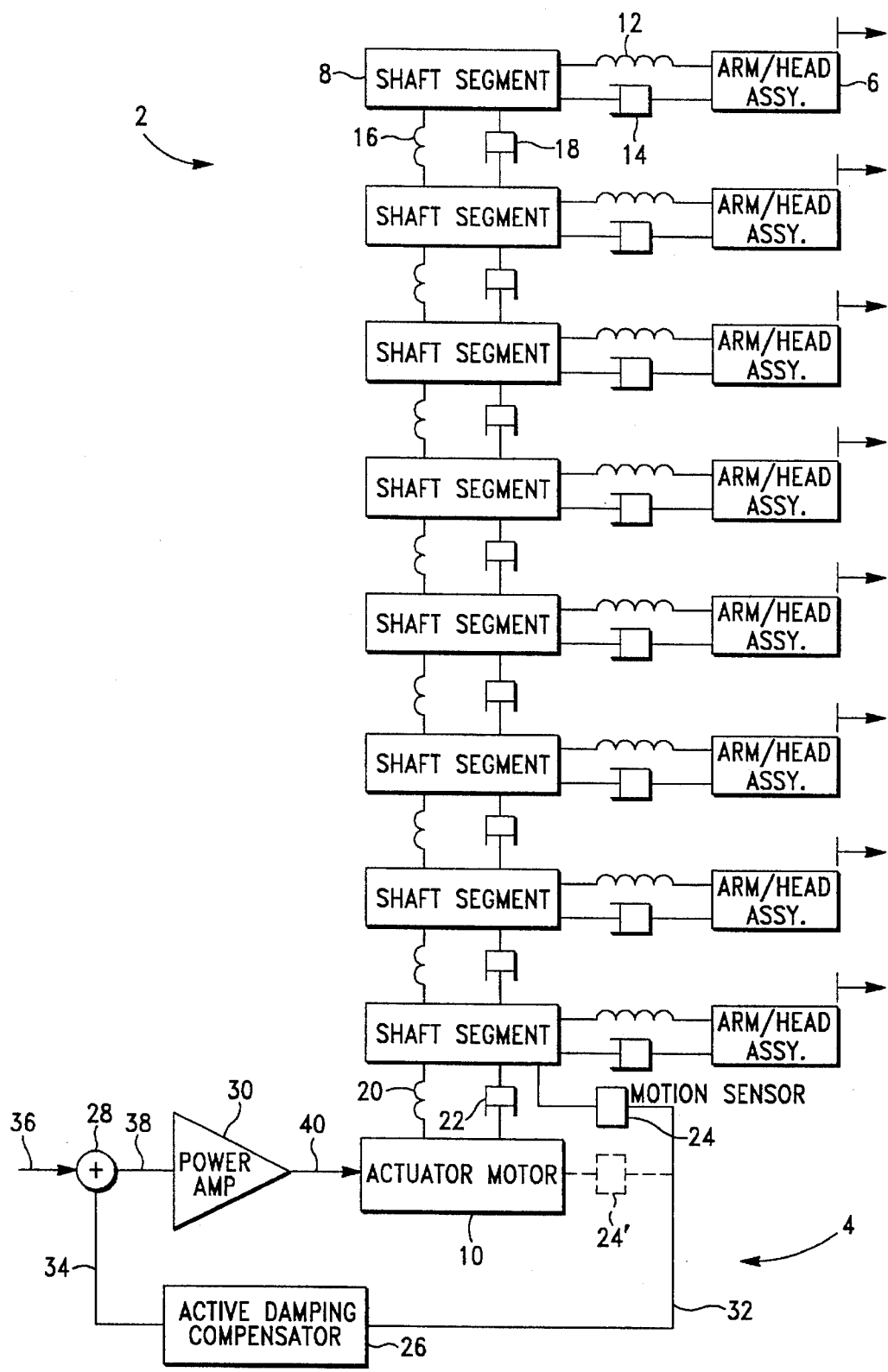
FIG. 1 is a diagram for a discrete mechanical model of a disc drive system that incorporates an active damping system according to the present invention.

Referring to the drawings, wherein reference characters designate like or corresponding parts throughout the views, FIG. 1 is a block diagram of a typical rotary actuator disc drive system 2 that incorporates an active damping system 4 according to the present invention. Although the disk drive rotary actuator example indicates how the active damping system is incorporated into a motion control system, motion control applications for the active damping system are not limited to disk drives, nor are they limited to rotary actuators. The disc drive system 2 comprises a plurality of actuator arm/head assemblies 6, with each of the assemblies 6 coupled to its own corresponding one of a plurality of actuator shaft segments 8, each of which constitute an actuator shaft position. The shaft segments 8 are in turn coupled to each other and to an actuator motor 10.

For purposes of illustration, eight of the assemblies 6 are shown coupled to eight of the shaft mountings 8 in FIG. 1, although the disc drive system 2 may comprise a greater or lesser number of these components, depending on data storage requirements. The mechanical yaw motion flexibility and structural damping of each assembly 6 is represented by a plurality of springs 12 and dash pots 14 in FIG. 1.

The model of each assembly 6 is comprised of one of the springs 12 in parallel with one of the dash pots 14. Thus, for purposes of illustration only, eight of the springs 12 are shown in combination with eight of the dash pots 14 in FIG. 1.

Of course, each of the assemblies 6 is physically continuous or distributed mechanical structure that does not physically comprise one of the springs 12 in combination with one of the dash pots 14. However, each of the assemblies 6 can be represented, for control system modeling purposes, to have a characteristic spring constant, represented by one of the springs 12, damped by a characteristic damping pot represented by a corresponding one of the dash pots 14.

Consequently, each of the assemblies 6 have a characteristic resonance with a frequency that is determined by the effective mass of the corresponding actuator arm/head assembly 6 and the effective spring constant of the assembly 6 represented by the associated one of the springs 12. This characteristic resonance is damped in amplitude by the structural damping of the coupling represented by the associated one of the dash pots 14.

Likewise, each of the shaft mountings 8 are coupled to each other, and the mountings 8 are in turn coupled to the actuator motor 10. For purposes of illustration only, each of the shaft segments 8 is represented by one of a plurality of springs 16 in parallel with a corresponding one of a plurality of dash pots 18 that represent torsional motion of each shaft segment 8.

Thus, each of the shaft segments 8 has its own characteristic resonance that depends on the effective mass of any of the assemblies 6 and shaft segments 8, and the shaft segment spring constant represented by a corresponding one of the springs 16. The characteristic resonance is damped in amplitude by the structural damping of the shaft segments 8 represented by the associated one of the dash pots 18.

Finally, the coupling between the shaft mountings 8 and the actuator motor 10 is represented for purposes of illustration only by a spring 20 in parallel with a dash pot 22. The shaft/motor coupling has its own characteristic resonance that depends upon the effective mass of the assemblies 6, shaft mountings 8 and actuator motor 10 coupled to it and the spring constant represented by the spring 20. The characteristic resonance is damped in amplitude by the structural damping of the shaft/motor coupling represented by the dashpot 22.

Because of the different spring constants and different effective masses at different mechanical locations throughout the disc drive system 2, it is evident that a plurality of different mechanical resonant frequencies can be excited due to seek activity or external disturbances of the disc drive system 2. Thus, the mechanical resonances that may be excited in the disc drive system 2 extend over a range of frequencies. The actual set of resonant frequencies and modes are actually due to the very complex interaction of all the above-mentioned dynamics.

These resonance frequencies may be controlled to some extent by passive design means to dampen the structure, or means to stiffen the structure to raise them to frequencies above those of interest, or both. However, practical design considerations usually prevent these resonances from being effectively or completely controlled with such measures. For instance, to secure higher mechanical resonance frequencies in the disc drive system 2, it is necessary to provide greater stiffness in the arms, shaft and shaft/motor couplings.

Although greater stiffness can be achieved to some extent by optimum design and selection of materials, it generally involves increasing the size of the corresponding physical structure, and therefore the mass. The greater mass however tends to lower the frequency of resonance. Greater mass also increases the response time of the disc drive system 2 for control purposes.

The resonances can be passively damped to a limited extent by adding mechanical damping or structural damping materials, but the increased inertia of the resultant physical structure then decreases the response time of the disc drive system 2 for control purposes and the variability of the resulting damping obtained over temperature may be intolerable. Thus, the passive mechanical design approaches for damping mechanical resonances in the disc drive system 2 are often unsuited or only a partial solution.

The present invention reliably and effectively damps these troublesome mechanical resonances in the feedback loop provided by the active damping system 4. The active damping system 4 makes the disc drive system 2 perform as if it has a much more rigid physical structure for control purposes without increasing size or mass of the physical structure and without sensitivity to ambient conditions such as temperature and humidity.

The active damping system comprises a motion sensor 24, such as an accelerometer, an active damping compensator 26, a summing element 28 and includes power amplifier 30. The motion sensor 24 is mounted on or very near the source, or locus, of control effort for the system. The locus of control effort is the point in the mechanical structure of the system upon which the actuator motor 10 applies control force or torque to the structure.

In this case, the motion sensor 24 is mounted on or very near the actuator motor 10 to provide a collocated or nearly collocated motion signal that represents the vibratory motion of the structure that reflects excitation of the unwanted resonances. FIG. 1 shows the motion sensor 24 at a nearly collocated location since as a practical matter it is not possible to have sensor 24 in an ideal collocated position which is illustrated by dotted lines and motion sensor 24'. The motion sensor 24 is any suitable motion sensor, such as an accelerometer, a velocity sensor, a strain gauge or a flexure gauge. For sensing angular motion, the motion sensor 24 may comprise a pair of linear accelerometers that are mounted in opposition about the locus of the control effort to sense tangential acceleration components and with limited sensitivity to translational accelerational components.

The motion signal produced at the output of the motion sensor 24 is fed to the input of the active damping compensator 26 via a motion signal line 32. The active damping compensator 26 modifies the motion signal received from the motion sensor 24 with selective signal bandpass and amplification processing to produce an active damping feedback signal.

The active damping compensator 26 processes the motion signal to provide an active damping feedback signal that selectively accentuates the frequency content of the sensed signal to coincide with the range of frequencies of the resonances to be damped. This amplifies the output of the motion sensor 24 proportional to the amplitude of the resonances of the mechanical structure. The signal processing functions of the active damping compensator 26 are described in detail below and the details of the circuitry to perform the functions are well known.

The active damping feedback signal produced at the output of the active damping compensator 26 is fed to the input of the summing element 28 via a line 34. The summing element 28 combines a command signal on a line 36 from an associated servo controller (not shown) in the disc drive system 2 with the active damping feedback signal on the line 34.

The summing element 28 produces an actuator control signal that is proportional to the command signal on the line 36 and the active damping feedback signal on the line 34. The summing element 28 in this case is a well known element and therefore not described in further detail.

The actuator control signal produced at the output of the summing element 28 is fed to the input of a power amplifier 30 via a line 38. The power amplifier 30 produces an actuator drive signal that has a power level suitable for driving the actuator motor 10. The power amplifier 30 typically is a transconductance type that supplies the actuator motor 10 with current proportional to actuator control signal voltage. The power amplifier 30 produces the actuator drive signal by proportionally amplifying the actuator control signal to the suitable level. The power amplifier 30 is a well known element and therefore not described in further detail.

The actuator drive signal produced at the output of the power amplifier 30 is fed to the input of the actuator motor 10 via a drive signal line 40. This completes the entire feedback loop for the active damping system 4. Alternatively, if the actuator control signal on the line 38 has a suitable power level, the power amplifier 30 can be deleted, and the actuator control signal on the line 38 can be used to drive the actuator motor 10 directly.

Figure 2:
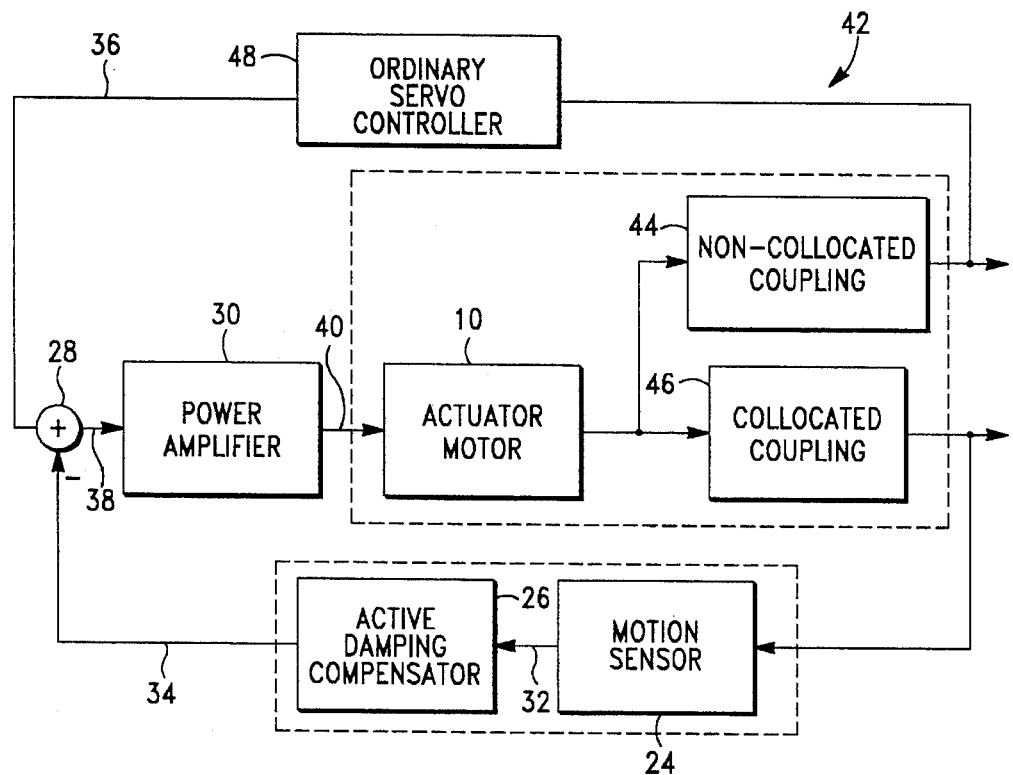
FIG. 2 is a detailed diagram of a servo control system that incorporates the active damping system according to the present invention.

FIG. 2 shows a detailed block diagram of an electronic servo control system 42 that uses the active damping system 4. The servo system 42 comprises the actuator motor 10, the motion sensor 24, the active damping compensator 26, the summing network 28 and the power amplifier 30 as described above in connection with FIG. 1.

For purposes of illustration only, in FIG. 2 the mechanical coupling of the servo feedback loop and the active damping loop is represented as a non-collocated coupling 44 and a nearly collocated coupling 46. The non-collocated coupling 44 represents the normal actuator feedback transfer function(s) that provide(s) position feedback to an ordinary servo controller 48. The nearly collocated coupling 46 represents the transfer function of the mechanical coupling of the motor 10 to the motion sensor 24 as described above in connection with FIG. 1.

The servo controller 48 is a well known element that is not itself part of the present invention, and therefore is not described in further detail. The servo controller provides the command signal on the line 36 as described above in connection with FIG. 1.

Thus, the servo control command signal and the active damping feedback signal are summed together and amplified by the power amplifier 30 to drive the actuator motor 10. The feedback provided by the active damping compensator 26 thus contributes to the servo control command signal to provide an actuator drive signal on the line 40 that both reduces the unwanted vibrations sensed by the motion detector 24 through the nearly collocated mechanical coupling 46 and corrects position errors that are encountered during positioning operations.

In the case of a servo position control system 42 used in a disc drive, the arrangement and placement of the nearly collocated coupling 46 and the motion sensor 24 depend on the operation of the actuator motor 10 that is used. If the actuator motor is of the voice coil or linear type, the motion that is sensed for the active damping system 4 is preferably the linear acceleration of the actuator motor 10.

To sense that portion of unwanted vibrations induced by the actuator motor 10 that cause linear acceleration, the nearly collocated coupling 46 is mounted to the carriage of the actuator motor 10. The motion sensor 24 is preferably a single accelerometer to measure linear motion transmitted through the nearly collocated coupling 46.

If the actuator motor 10 is of the rotary type, the motion that is sensed for the active damping system 4 is preferably the angular acceleration of the actuator motor 10. This rotary motion is preferably sensed by using a pair of accelerometers for the motion sensor 24 and in this case the nearly collocated mounting 46 secures them in opposition to each other around the axis of rotation of the actuator motor 10. Of course, other means for sensing the rotary motion can be used without departing from the teachings of this invention.

In either case, acceleration feedback, either directly sensed or derived, is preferred to help elevate the magnitude of the sensed mechanical resonances above the low frequency rigid body dynamics in the collocated transfer function. Generally, active damping is not required at low frequencies where the actuator behaves like a rigid body.

Once the nearly collocated motion signal is available on the line 32, the active damping compensator 26 processes it into the active damping loop feedback signal on the line 34 that is feedback to the power amplifier 30 via the summing element 28. The command signal on the line 36 from the servo controller 48 is combined with the active damping loop feedback signal on the line 34 in the summing element 28.

The drive signal on the line 38 actually comprises the combination of the command signal on the line 36 and the active damping loop feedback signal on the line 34. Thus, the active damping provided by the present invention may be an add on system to an existing servo control positioning system. The added components necessary for active damping comprise the motion sensor 24, the active damping compensator 26 and the summing element 28. The other elements in the servo control positioning system 42 are those normally used for servo control without active damping.

Figure 12:
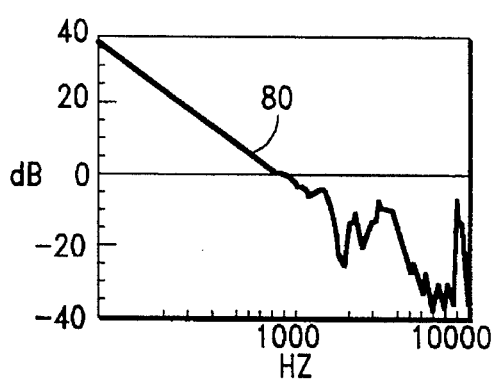
FIG. 12 is the resultant closed loop non-collocated frequency response magnitude characteristic of the noncollocated actuator incorporating active damping according to the present invention as a function of frequency.

The transfer function from the command signal on the line 36 to the displacement of the positioned elements, such as the transducer heads located at the arm tips 6 in FIG. 1, is shown in FIG. 12 and does not exhibit the lightly damped mechanical resonances that occur without the active damping system 4 at frequencies where the active damping compensator 26 passes or accentuates corrective feedback signals. Without the active damping system, this transfer function would appear as in FIG. 4, and contain lightly dampened resonances.

The suppression of resonances achieved with the active damping system 4 is completely different than the insertion of notch or low pass filters in the control loop, as adopted in many servo control positioning systems. With the active damping system 4, the gain of the feedback loop through the nearly collocated signal path is accentuated over the frequency range of the lightly damped structural resonances.

With notch filter feed forward or low pass filter techniques, the gain of the feedback loop is attenuated in the frequency range of the lightly damped structural resonances. This means that there is no effective loop gain at the resonant frequencies, and thus the control loop expends no effort to damp the resonances. The notch or low pass filtering techniques simply prevent the control loop from exacerbating the instability of the system caused by presence of such resonances.

Furthermore, the active damping system 4 is not acutely sensitive to component parameters that may cause shifts in the frequencies or damping of the lightly damped structural resonances or notch filter bandstop frequencies. The high gain of the active damping system extends over a wide range of frequencies that the system is designed to actively dampen. The active damping system 4 also introduces less phase shift than notch or low pass filtering of the position feedback signal because the active damping system is designed to have negligible loop gain at low frequencies.

The active damping system 4 is also superior because actively damped actuator resonances are never allowed to be excited by seek motion or other disturbances with the active damping system 4 turned on. Furthermore, the active damping system 4 may be left operational in all modes of servo operation including times when the actuator motor 10 is used for a seeking operation. Thus, the active damper also operates while the servo controller is regulating actuator velocity as well.

With active damping, the servo controller 48 is confronted with a physical structure driven by the actuator motor 10 that appears more like a rigid body over a greater frequency range. In this sense the active damping system may be designed to be "invisible" to the servo controller 48. This also allows the active damping system 4 to be "plugged into" an existing servo system.

After the active damping system 4 is incorporated into the servo positioning system 42, the servo controller 48 may be optimized for higher control of gain or bandwidth. This is another major benefit of incorporating the active damping system 4 into the servo control positioning system 42. It enables significantly improved tracking accuracy in the presence of run out, friction, windage and servo controller quantization noise. In disc drives, the active damping system 4 helps enable higher track densities.

The active damping compensator 26 is preferably operable over a large range of active damping loop feedback signal amplitudes. To achieve this, it is desirable that the active damping compensator 26 include an automatic gain control feature to prevent saturation of the power amplifier 30 due to exceptionally large signal amplitudes in the active damping feedback loop.

Figure 3:
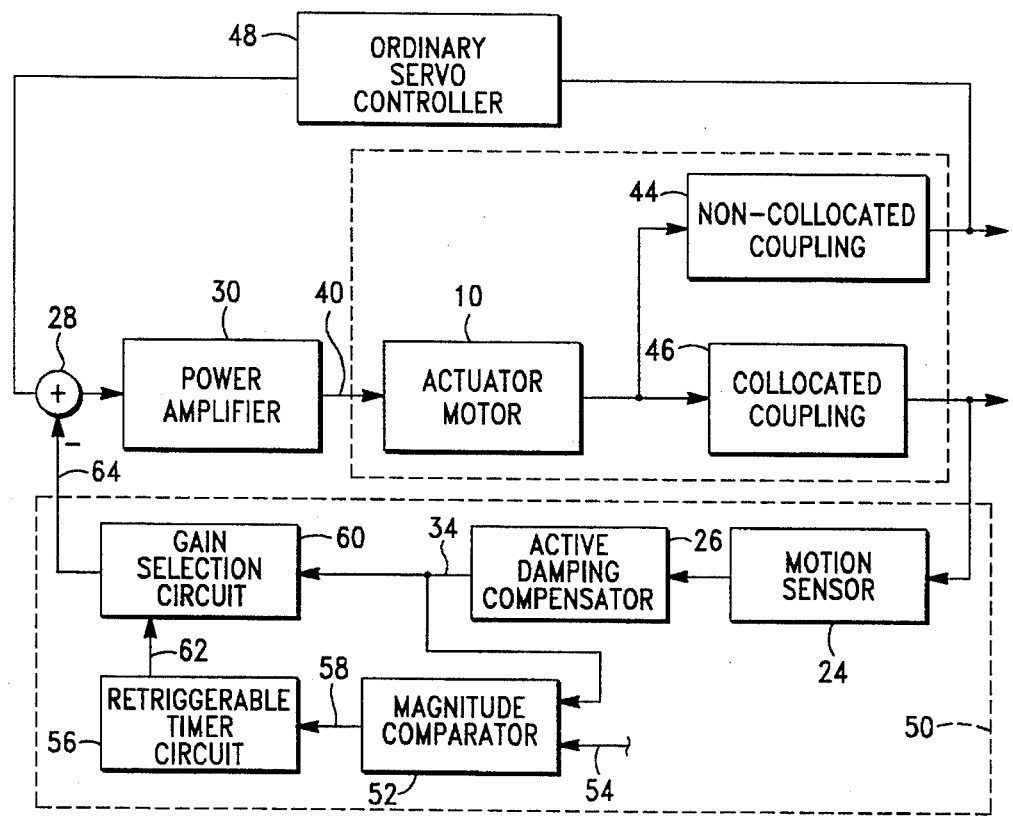
FIG. 3 is a preferred implementation of a gain scheduling feature to provide automatic gain control for the active damping system according to the present invention.

A preferred implementation of a gain scheduling feature to provide automatic gain control for the active damping system according to the present invention is shown in FIG. 3. It is described with two discrete gain ranges that are automatically switched, although additional gain ranges or a continuously variable gain range may be used.

A gain scheduling active damping system 50 comprises the same components as described above for the active damping system 4 in connection with FIGS. 1 and 2. However, the gain scheduling active damping system 50 also comprises a magnitude comparator 52 that has a first input coupled to the active damping feedback loop signal from the active damping compensator 26 on the line 34.

The magnitude comparator 52 compares the amplitude or magnitude (its absolute value) of the active damping feedback loop signal with a predetermined damping feedback signal limit level that is coupled to a second input of the magnitude comparator 52 on a limit level line 54. The level of the damping feedback limit level on the line 54 is selected to correspond to a level of the active damping feedback loop signal on the line 34 above which a change in active damping feedback loop gain is necessary to ensure that saturation of the power amplifier 30 does not occur due to active dampening control action.

The magnitude comparator 52 simply provides an output that is responsive to a difference in levels between its two inputs, and therefore may constitute no more than an ordinary differential amplifier. Its output is coupled to the input of a retriggerable timer circuit 56 over comparator line 58. The retriggerable timer 56 produces a timer signal on a timer signal line 62.

The retriggerable timer 56 is triggered whenever the output signal from the magnitude comparator 52 on the line 58 indicates that the amplitude level of the active damping feedback loop signal on the line 34 exceeds that of the feedback limit level on the limit level line 54. Since the magnitude comparator 52 only senses instantaneous signal levels, the purpose of the retriggerable timer 56 is to provide a constant loop gain for a preselected period after the timer 56 is triggered, even when the active damping loop signal on the line 34 only exceeds the level limit temporarily.

This may occur, for instance, when line 34 displays an oscillatory characteristic and its level only exceeds the limit level on signal peaks, but repetitively over the period required for correction. In this case, it is desirable for the gain of the active damping feedback loop to be reduced for a period that is sufficiently long to let the active damping feedback loop signal decay to a level not exceeding that of the limit level.

The retriggerable timer 56 provides this operation by generating a constant level that indicates a gain selection command for a predetermined period after the magnitude comparator 52 detects that the active damping feedback signal exceeds the limit level. The predetermined period is preferably selected to have a duration that exceeds half of the period corresponding to the lowest frequency actively damped mode.

The retriggerable timer 56 may comprise any timer circuit that provides a constant output for a preselected period in response to a trigger signal of selected amplitude. In this case, the trigger signal for the retriggerable timer 56 is the output signal from the magnitude comparator 52 on the line 58. The retriggerable timer 56 resets after the preselected period expires.

The output of the retriggerable timer 56 is fed to a gain select input of a gain selector circuit 60 via a line 62. The gain selector circuit 60 is preferably an amplifier that provides one or another of two amplification levels of gain in response to the output of the retriggerable timer 56 on the line 62. Thus, the output of the timer 56 serves as a gain select signal for the gain selector circuit 60.

A signal input for the gain selector circuit 60 is coupled to the output of the active damping compensator 26. The output of the gain selector circuit 60 is fed to one of the inputs of the summing element 28 on a line 64.

The principle of the active damping system according to the present invention calls for the use of dedicated local feedback with accentuated loop gain in the frequency region or regions of poorly damped electromechanical actuator resonances in an electronic servo position control system such as used for transducer head positioning in a disc drive. The crux of this invention is to create a feedback loop structure, distinct from the positioning servo system, whose main purpose is to provide substantial auxiliary control action in the frequency range of the significant resonances of the actuator used in the servo positioning system by shaping the frequency response of the active damper feedback loop in an appropriate manner.

To simplify the overall design for the active damping system, the frequency response of the active damping system may be tailored to have little or no gain at relatively low frequencies. This is possible because all of the frequencies of any significance in the active damper feedback loop are in a relatively high frequency range. This approach allows the active damper feedback loop to be designed, adjusted and operated independently of the associated servo controller 48 because the different frequency ranges of operation prevent them from adversely interacting with each other.

The first step in designing the active damping compensator 26 for one of the active damping systems 4 or 50 described above is to measure or model the transfer function of the non-collocated actuator in the servo positioning system. In this case, the transfer function is represented in terms of the displacement of the controlled element, such as one of the assemblies 6, as driven by the actuator drive signal from the input of the power amplifier 30 on the line 38 as a function of the frequency of the actuator drive signal.

Figure 4:
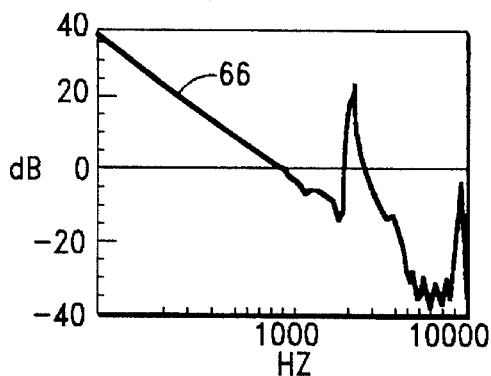
FIG. 4 is a graphical representation of a typical frequency response magnitude characteristic for a non-collocated positioning actuator mechanics of the servo control positioning system shown in FIG. 2.

A typical transfer function of a non-collocated actuator in the servo control positioning system 42 as a function of frequency is represented by a line 66 in FIG. 4. In this example, significant actuator resonances are concentrated in the frequency range extending from about 2 KHz to 3 KHz. To achieve active damping of these resonances, the active damping motion sensor 24 must be situated on the actuator structure so as to provide a significant amount of signal in the frequency range of these resonances.

Figure 5:
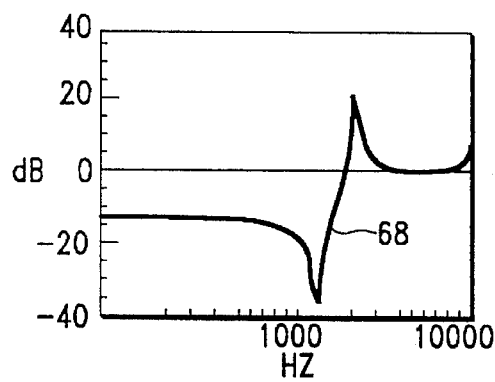
FIG. 5 is a graphical representation of a typical frequency response magnitude characteristic for the nearly collocated actuator mechanics of the servo positioning system shown in FIG. 2.

A typical frequency response characteristic for the nearly collocated actuator mechanics as measured by motion sensor 24 is represented by a line 68 in FIG. 5. The motion sensor 24 should ideally be situated so that it is roughly coincident with the location of actuating control effort to achieve the nearly collocated phase response described below.

It is advantageous to select the mounting location for the motion sensor 24 to be as close as possible to the point where control force or torque is applied to the actuator structure. If this is done in an ideal sense, the resultant collocated actuator transfer function is distinguished by a pole/zero alternation pattern in the S-plane. This pattern is very desirable for ensuring good stability margins for the active damping feedback loop, especially when large loop gain is introduced at high frequencies, where uncertainty in the actuator dynamics may be problematical.

Generally, the phase response of a truly or ideally collocated system is limited to a 180 degree range over the entire frequency range. The phase response of the nearly collocated actuator transfer function using one of the active damping systems 4 or 50 for the servo positioning system 42 in the example described above is represented by a line 70 in FIG. 6. The phase shift for the nearly collocated actuator transfer function represented by the line 70 is limited to about a 220 degree range.

In contrast, the phase response of the non-collocated actuator transfer function using the servo positioning system 42 without active damping in the example described above is represented by a line 72 in FIG. 7. The phase shift for the non-collocated actuator transfer function represented by the line 72 extends over approximately 370 degrees.

Figure 6:
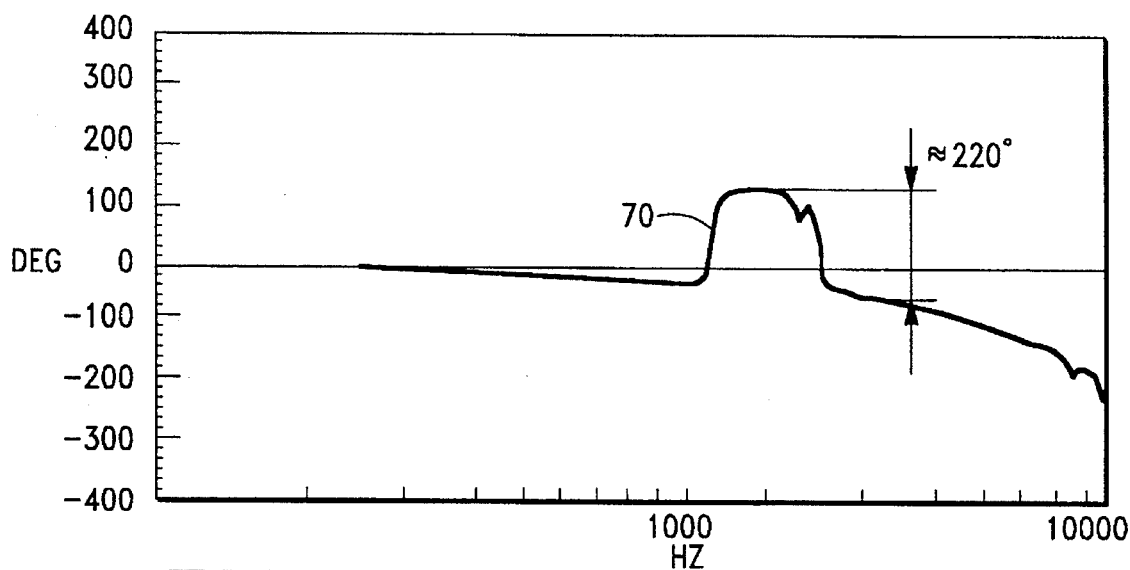
FIG. 6 is a graphical representation of the phase response for the nearly collocated mechanics corresponding to FIG. 5.
Figure 7:
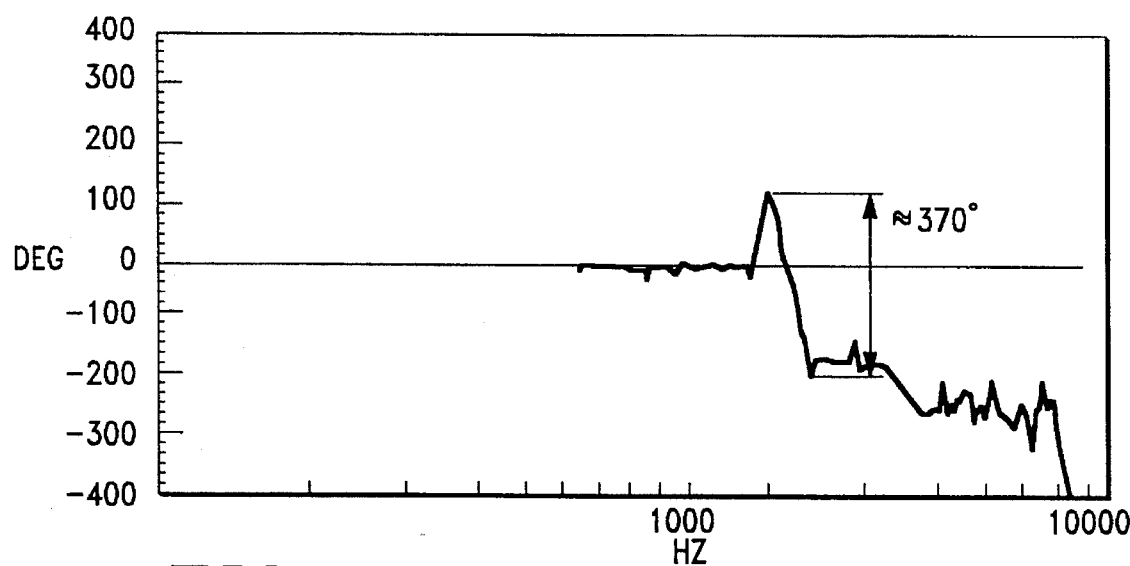
FIG. 7 is a graphical representation of the phase response of the non-collocated actuator mechanics corresponding to FIG. 4.

The much reduced phase shift of the nearly collocated actuator transfer function represented by the line 70 in FIG. 6, compared with the noncollocated phase shift represented by the line 72 in FIG. 7, permits feedback loop design of greater stability with higher overall servo loop gain, even at high frequencies. Thus, high frequency attenuation with the use of notch or low pass filtering is not required.

Of course, although the collocated transfer functions described above are specifically directed to sensing linear or angular acceleration, other transfer functions that are derived from other sensed parameters, such as velocity, displacement or strain, may be utilized in a similar fashion.

One objective of the active damping system according to the present invention is to prevent the actuator resonances in an electronic servo control positioning system from being excited by external inputs, including control forces or torques and mechanical or electrical disturbances to the actuator. To avoid such excitation from these inputs, the active damping system must generate an active damping loop feedback signal that serves to match the total control and disturbance excitation to the actuator at the selected resonant frequencies to counteract their effect.

In FIG. 2, this active damping feedback loop signal is produced by the active damping compensator 26 on the line 34. Therefore, the active damping compensator 26 must have access to the actuating signal, the motion signal on the line 32 provided by the nearly collocated motion sensor 24 in FIG. 2. Once the active damping feedback loop is closed, by summing the active damping loop feedback signal on the line 34 with the servo loop command signal on the line 36 in the summing network 28, substantial reduction of the effect of these disturbances takes place to minimize actuator resonance excitation.

To this end, it is desirable to characterize the complementary sensitivity transfer function of the active damping loop to have a magnitude of approximately one in the frequency range, or ranges, of the actuator resonances. The complementary sensitivity transfer function in this case, according to feedback theory, is the open loop gain divided by the open loop gain plus one. Thus, the open loop gain of the active damping compensator 26 must be reasonably high within the frequency range of the unwanted actuator resonances.

Figure 8:
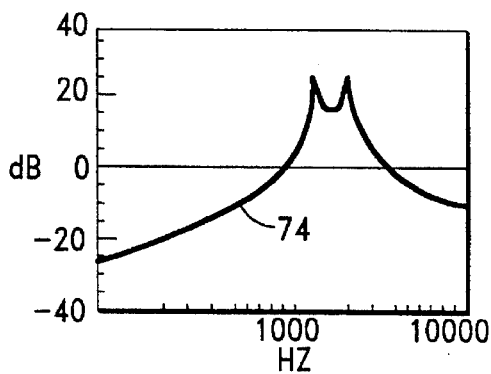
FIG. 8 is a graphical representation of a suitable frequency response magnitude characteristic for the active damping compensator according to the present invention.

In the example described above, the unwanted resonances, as shown in FIG. 4, are primarily in the 2 KHz to 3 KHz range. A suitable transfer function for the active damping compensator 26 as a function of frequency in this case is represented by a line 74 in FIG. 8.

The open loop gain of the active damping compensator 26 represented by the line 74 as a function of frequency is shown, with increasing frequency, to exceed unity, or 0 db, at about 1.0 KHz. Increasing in frequency from this 0 db level, it has two peak levels of approximately 30 db at about 1.5 KHz and 2.1 KHz respectively, with a droop between these peaks down to approximately 15 db at about 1.7 KHz. Beyond the upper peak gain level at about 2.1 KHz, the gain decreases with increasing frequency to drop back down to 0 db at about 3.7 KHz.

The open loop gain of the active damping compensator 26 represented by the line 74 as a function of frequency is not less than approximately 15 db throughout the range of frequencies from about 1.3 KHz to about 2.7 KHz. The open loop magnitude response of the motion detector 24 cascaded with the active damping compensator 26 as a function of frequency, using the response of the sensor 24 lumped with the transfer function of the nearly collocated mechanics 46 shown in FIG. 5, is indicated by a line 76 in FIG. 9. The line 76 thus represents the overall open loop gain of the active damping loop described above.

The open loop gain of the active damping loop is at least unity within the frequency range extending from approximately 1.7 KHz to approximately 3.7 KHz, with a peak of about 38 db at approximately 2.5 KHz. The gain is about 10 db at the 2 and 3 KHz points of the active damping loop gain transfer function. Since the complementary transfer function for the active damping loop represents its loop gain divided by its loop gain plus one, the complementary sensitivity transfer function for the active damping loop is approximately one throughout the 2 KHz to 3 KHz frequency range.

Figure 9:
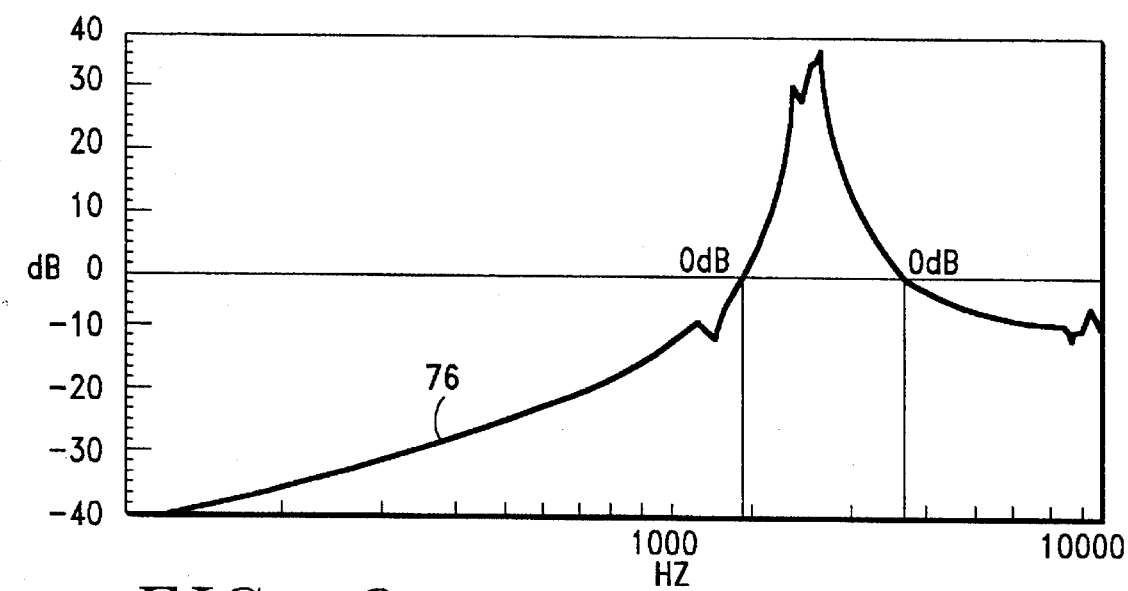
FIG. 9 is a graphical representation of a suitable open loop response magnitude characteristic of the active damping feedback loop according to the present invention, comprising the motion sensor response cascaded with the active damping compensator response and the nearly collocated actuator response.
Figure 10:
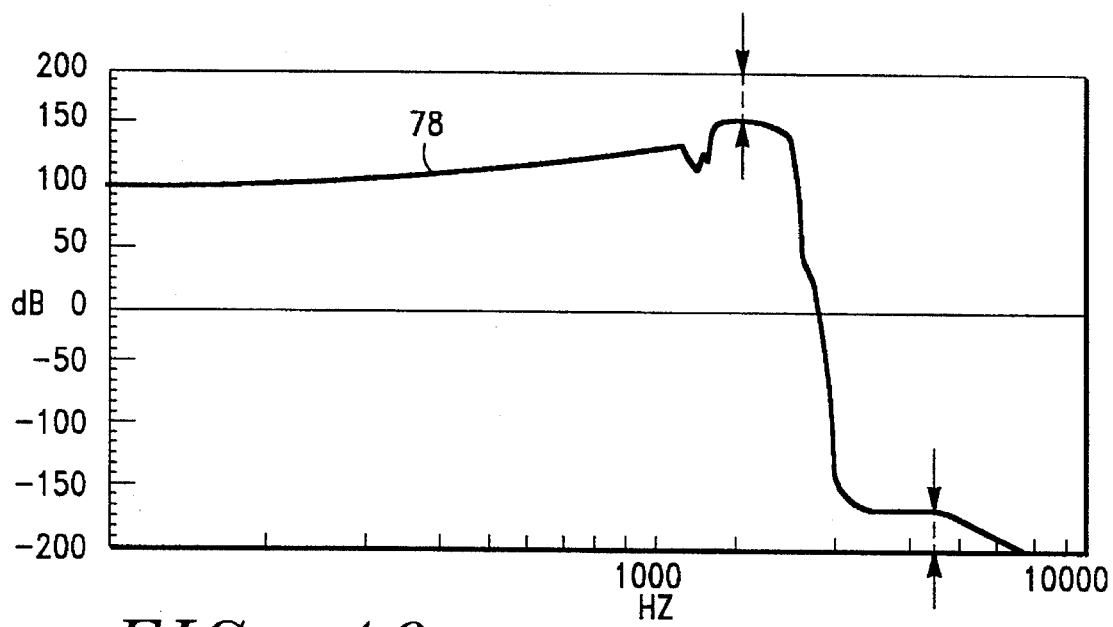
FIG. 10 is the phase response of the active damping loop corresponding to FIG. 9.

As a practical matter, the gain of the active damping loop as shown in FIG. 9 is limited by the permissible amount of phase shift within the bandpass range of the loop. In FIG. 10, a line 78 represents the corresponding phase shift of the active damping loop as a function of frequency. Within the frequency range that the active damping loop gain exceeds unity, the phase shift of the active damping loop does not exceed approximately 160 degrees. This variation amounts to low and high frequency phase margins of approximately 40 degrees if a 200 degree variation from a reference phase is permissible for stability.

Figure 11:
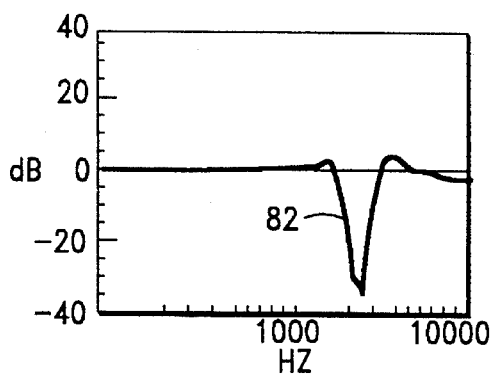
FIG. 11 is a graphical representation of the closed loop sensitivity frequency response magnitude characteristic of the active damping loop.

The closed loop sensitivity magnitude transfer function of the active damping loop is represented by a line 82 as a function of frequency in FIG. 11. The sensitivity transfer function in this case, according to feedback theory, is the reciprocal of the open loop gain plus one. The sensitivity magnitude transfer function represented by the line 82 thus indicates the amount of additional resonance attenuation provided by the active damping loop for the non-collocated transfer function, as represented by the line 66 in FIG. 4. This transfer function is what servo controller 48 "sees" without the active damping system.

The resultant-damped non-collocated transfer function of the actuator as a function of frequency is represented by a line 80 in FIG. 12. This transfer function is the result of cascading the sensitivity transfer function represented by a line 82 in FIG. 11 with the original noncollocated transfer function represented by the line 66 in FIG. 4. The transfers function in FIG. 12, is what servo controller 48 "sees" with the active damping system working. The unwanted resonances in this example are attenuated approximately 30 db.

The effect of the active damper loop at lower frequencies preferably is small. This is done intentionally to minimize interaction between the nearly collocated active damper loop and the non-collocated servo positioning loop, and to allow the servo controller 48 to be designed independently of the active damping loop. The active damper loop is also designed to have low gain at frequencies higher than the frequency range of the unwanted resonances to minimize its reaction to unmodeled high frequency dynamics and wide band noise produced by the nearly collocated motion sensor 24.

Because the active damping loop gain is generally high at least at some frequencies, the magnitude of the signal in the active damping loop must be limited to avoid saturation of the power amplifier 30. The gain selector circuit 60 for the active damping system 50 shown in FIG. 3 limits the magnitude of the active damping loop feedback signal by selecting an appropriate loop gain value based on the magnitude of the excitation of the active damping compensator 26, as described above.

Thus, there has been described herein methods and apparatus for providing improved gain and bandwidth for ordinary servo controlled positioning systems by providing a collocated or nearly collocated feedback loop that operates in parallel with the ordinary feedback loop used for position feedback. It will be understood that various changes in the details, methodology, parts, and configurations described above to explain the nature of the present invention may be made by those skilled in the art within the principle and scope of the present invention as expressed in the appended claims.

What is claimed is:

1. A method of stabilizing a control servo system including an actuator system having a controlled element, an actuator for moving said controlled element, and a mechanical structure coupling said actuator and said controlled element, said servo control system further including a non-collocated position sensor for sensing a displacement of said controlled element, a controller for positioning said controlled element by controlling said actuator, a primary feedback loop from said position sensor to said controller, comprising steps of:

embedding a secondary feedback loop within said primary feedback loop, the secondary feedback loop including a substantially collocated transducer positioned on said actuator system in an area in proximity to said actuator;

converting mechanical oscillations of said actuator system at the area in proximity to said actuator into a nearly collocated motion signal;

processing said motion signal, said step of processing said motion signal including the steps of filtering said motion signal to accentuate said motion signal at a resonant frequency of said actuator system, amplifying said filtered motion signal and modifying the amount of amplification of said filtered motion signal in response to the level of said filtered motion signal relative to a reference signal level; and modifying the effect of said controller in said primary feedback loop on said actuator in response to said processed motion signal from said secondary feedback loop to actively dampen oscillations of said actuator system at said resonant frequency.

2. Apparatus for stabilizing a control servo system including an actuator system having a controlled element, an actuator for moving said controlled element and a mechanical structure coupling said actuator and said controlled element, said control servo system further including a non-collocated position sensor for sensing a displacement of said controlled element, a controller for positioning said controlled element by controlling said actuator and a primary feedback loop from said position sensor to said controller, comprising:

a secondary feedback loop embedded within said primary feedback loop, the secondary feedback loop comprising:

a substantially collocated transducer positioned on said actuator system in an area in proximity to said actuator for converting mechanical oscillations of said actuator system in the area in proximity to said actuator to a motion signal;

means for processing said motion signal, said means for processing comprising means for filtering said motion signal to accentuate signal components at a resonant frequency of said actuator system, means for amplifying said filtered motion signal and limiting means for modifying the amount of amplification of said filtered motion signal in response to a reference signal level; and means for modifying the effect of said controller in said primary feedback loop on said actuator in response to said processed motion signal from said secondary feedback loop to actively dampen oscillations of said actuator system at said resonant frequency.

3. Apparatus for stabilizing a control servo system including an actuator system having a controlled element, an actuator for moving said controlled element and a mechanical structure coupled with said controlled element and said actuator for coupling said actuator and said controlled element, said control servo system further including a position sensor for sensing a displacement of said controlled element, a controller foro positioning said controlled element by controlling said actuator and a feedback loop from said position sensor to said actuator for modifying the effect of said controller on said actuator, by actively dampening both internally and externally created mechanical resonances in said actuator system, comprising:

means for converting said mechanical resonances of said actuator system to a motion signal, said means for converting coupled to said mechanical structure in proximity to the coupling of said actuator to said mechanical structure;

means for processing said motion signal, said means for processing comprising means for filtering said motion signal to accentuate signal components representative of said mechanical resonances, means for amplifying said filtered motion signal and limiting means for modifying the amount of amplification of said filtered motion signal in response to a reference signal level;

means for modifying the effect of said controller on said actuator in response to said processed motion signal; and wherein said limiting means comprises a magnitude comparator that compares the level of said filtered motion signal with said reference signal level to produce a gain select signal representative of said comparison, and a retriggerable timer that responds to said gain select signal to hold the level of said gain select signal for a period that exceeds half of the period of the lowest frequency of said mechanical resonances to be actively damped.

4. The apparatus as set forth in claim 3, wherein said actuator is of the linear motion type and said converting means comprises means for sensing linear acceleration.

5. The apparatus as set forth in claim 3, wherein said actuator is of the rotary motion type and said converting means comprises means for sensing angular acceleration.

6. The apparatus as set forth in claim 5, wherein said means for sensing angular acceleration comprises a pair of linear accelerometers arranged in relative opposition to accentuate tangential acceleration components while substantially rejecting translational acceleration components of the actuator.

7. The apparatus as set forth in claim 3, wherein said converting means comprises means for sensing velocity.

8. The apparatus as set forth in claim 3, wherein said converting means comprises means for sensing mechanical strain.

9. The apparatus as set forth in claim 3, wherein said converting means comprises means for sensing flexure.

10. A robust control servo system including an actuator system that actively dampens resonances, said actuator system having a controlled element, an actuator for moving said controlled element and a mechanical structure coupling said actuator and said controlled element, comprising:

a non-collocated feedback loop that comprises a position sensor for sensing a displacement of said controlled element and a controller for positioning said controlled element by controlling said actuator; and a nearly collocated feedback loop embedded within said non-collocated feedback loop comprising means for converting said mechanical resonances of said actuator system to a motion signal, said means for converting coupled to said mechanical structure in proximity to the coupling of said actuator to said mechanical structure, means for processing said motion signal to accentuate said motion signal in the frequency range of said mechanical resonances of said actuator system and means for modifying the effect of said controller on said actuator in response to said processed motion signal.

\* \* \* \* \*